US012606365B2

(12) United States Patent
Blake et al.

(10) Patent No.: US 12,606,365 B2
(45) Date of Patent: Apr. 21, 2026

(54) SELF REGULATING HEATER IN AN INTERMEDIATE BULK CONTAINER

(71) Applicant: Caliente LLC, Fort Wayne, IN (US)

(72) Inventors: James T. Blake, Wolcottville, IN (US); Tyler W. Ambriole, Fort Wayne, IN (US); Michael R. Kelly, Fort Wayne, IN (US)

(73) Assignee: Caliente LLC, Fort Wayne, IN (US)

( * ) Notice: Subject to any disclaimer, the term of this patent is extended or adjusted under 35 U.S.C. 154(b) by 898 days.

(21) Appl. No.: 17/862,822

(22) Filed: Jul. 12, 2022

(65) Prior Publication Data

US 2023/0024697 A1 Jan. 26, 2023

Related U.S. Application Data

(60) Provisional application No. 63/223,296, filed on Jul. 19, 2021.

(51) Int. Cl.
*B65D 88/74* (2006.01)
*H05B 3/34* (2006.01)

(52) U.S. Cl.
CPC ............ *B65D 88/744* (2013.01); *H05B 3/34* (2013.01); *H05B 2203/003* (2013.01); *H05B 2203/007* (2013.01)

(58) Field of Classification Search
CPC ................ H05B 3/34; H05B 2203/003; H05B 2203/007
USPC .................................................. 219/521, 528
See application file for complete search history.

(56) References Cited

U.S. PATENT DOCUMENTS

| | | | | |
|---|---|---|---|---|
| 6,222,160 | B1 * | 4/2001 | Remke | B65D 81/3476 219/528 |
| 2008/0135564 | A1 * | 6/2008 | Romero | B65D 81/3827 220/592.2 |
| 2018/0054031 | A1 * | 2/2018 | Philpott | B65D 88/74 |
| 2020/0305237 | A1 * | 9/2020 | Wu | H05B 3/0019 |
| 2021/0130086 | A1 * | 5/2021 | Russell | B65D 88/744 |

* cited by examiner

*Primary Examiner* — Steven W Crabb
*Assistant Examiner* — Alba T Rosario-Aponte
(74) *Attorney, Agent, or Firm* — TAYLOR & EDELSTEIN, PC

(57) ABSTRACT

A method for establishing and/or maintaining a desired temperature of a material in an intermediate bulk container including the steps of positioning a heating element in at least partial contact with a material container containing the material within the intermediate bulk container; and applying an electrical power source to the heating element, wherein the heating element is at least partially made of a positive temperature coefficient resistant material, the heat from the heating element being largely transferred to the material in the material container.

16 Claims, 6 Drawing Sheets

SELF REGULATING HEATER IN AN INTERMEDIATE BULK CONTAINER

CROSS REFERENCE TO RELATED APPLICATIONS

This is a non-provisional application based upon U.S. provisional patent application Ser. No. 63/223,296, entitled "SELF REGULATING HEATER FOR AN INTERMEDIATE BULK CONTAINER", filed Jul. 19, 2021, which is incorporated herein by reference.

BACKGROUND OF THE INVENTION

1. Field of the Invention

The present invention relates to intermediate bulk containers having an internal bladder with internal heaters.

2. Description of the Related Art

An Intermediate Bulk Container (IBC) is used in a variety of applications to transport various products across the globe. In one application the IBC is fitted with a heater and a bladder containing a solid (or semi-solid material) that when heat is applied undergoes a phase change to transfer the solid into a flowable material. Typical applications are the shipment of materials for food preparation where, for example essential fats, may be shipped in a semi solid state and phased changed to flowable material for mixing and processing.

An IBC fitted with a heater typically has an exterior container box with dimensions, which typically approximate 40"×45"×37", including an onsite constructed lid, a bladder, fitted with an integral inlet and outlet valve, and a heater.

The prior art heater construction utilized in an IBC is what is classified as a fixed resistance heater (i.e., resistance is relatively constant regardless of temperature) encapsulated between two materials (typically a piece of cardboard and aluminum foil). The fixed resistance heater is controlled by two thermostats. One thermostat serves as a temperature control device (sensing the temperature of the fluid and controlling an electrical connection between the fixed resistance heater and an electrical power source) and the second thermostat serves as an over-temperature safety device to disconnect the electrical heater from the electrical power source when the temperature exceeds a selected safety temperature.

The use of a fixed resistance heater in an IBC has several disadvantages, including:

- Thermal Runaway—It is known that the current fixed resistance heater construction can be put in an environment in which a thermal runaway can occur which could lead to a fire hazard. If the mass contained within the bladder is not distributed evenly across the heater and in intimate contact with the sensing devices this can cause a failure mode where one section of the heater may have a thermal runaway resulting in a fire. This failure mode is partially contributed to by the unevenly distributed load but also to the inherent flaws of a fixed resistance heater within an IBC both in the localized sensing of the temperature control device and the physics associated with a fixed resistance heater which provides constant power regardless of the environment it is in.

- Energy Efficiency—Fixed resistance heating systems within an IBC are not energy efficient since their energy consumption is fixed across the duration of the heat up cycle.
- Reliability, Predictability and Consistency—A significant limitation of fixed resistance heating systems is the variance that is inherent within the manufacturing of the control devices (thermostats) typically used in this application. The thermostats often have a hysteresis which results in unpredictable and unreliable performance between devices. The inconsistencies in control devices can result in inconsistent time to an ideal temperature between various IBCs and can result in higher than desired temperatures for the mediums being heated.

What is needed in the art is reliable, economical way of controlling the temperature in an IBC.

SUMMARY OF THE INVENTION

The present invention provides a method and an apparatus for heating a material in an IBC.

The invention in one form is directed to a method for establishing and/or maintaining a desired temperature of a material in an intermediate bulk container including the steps of positioning a heater element in at least partial contact with a material container containing the material within the intermediate bulk container; and applying an electrical power source to the heater element, wherein the heater element is at least partially made of a positive temperature coefficient resistant material, the heat from the heater element being largely transferred to the material in the material container.

The invention in another form is directed to a method of heating a material in an intermediate bulk container including the steps of positioning a first heater element beneath a material container containing the material within an intermediate bulk container; and applying an electrical power source to the heater element, wherein the heater element is at least partially made of a positive temperature coefficient resistant material, the heat from the heater element being largely transferred to the material in the material container.

The invention in yet another form is directed to a heating system for use in in an intermediate bulk container including a first heater element positioned beneath a material container containing a material within the intermediate bulk container; and an electrical power source suppling electrical power to the heater element, wherein the heater element is at least partially made of a positive temperature coefficient resistant material, the heat from the heater element being largely transferred to the material in the material container.

An advantage of the present invention is that heating elements in an IBC are self-regulating without the use of a thermostat.

Another advantage is that the heating elements have a preselected temperature at which the electrical resistance substantially increases.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
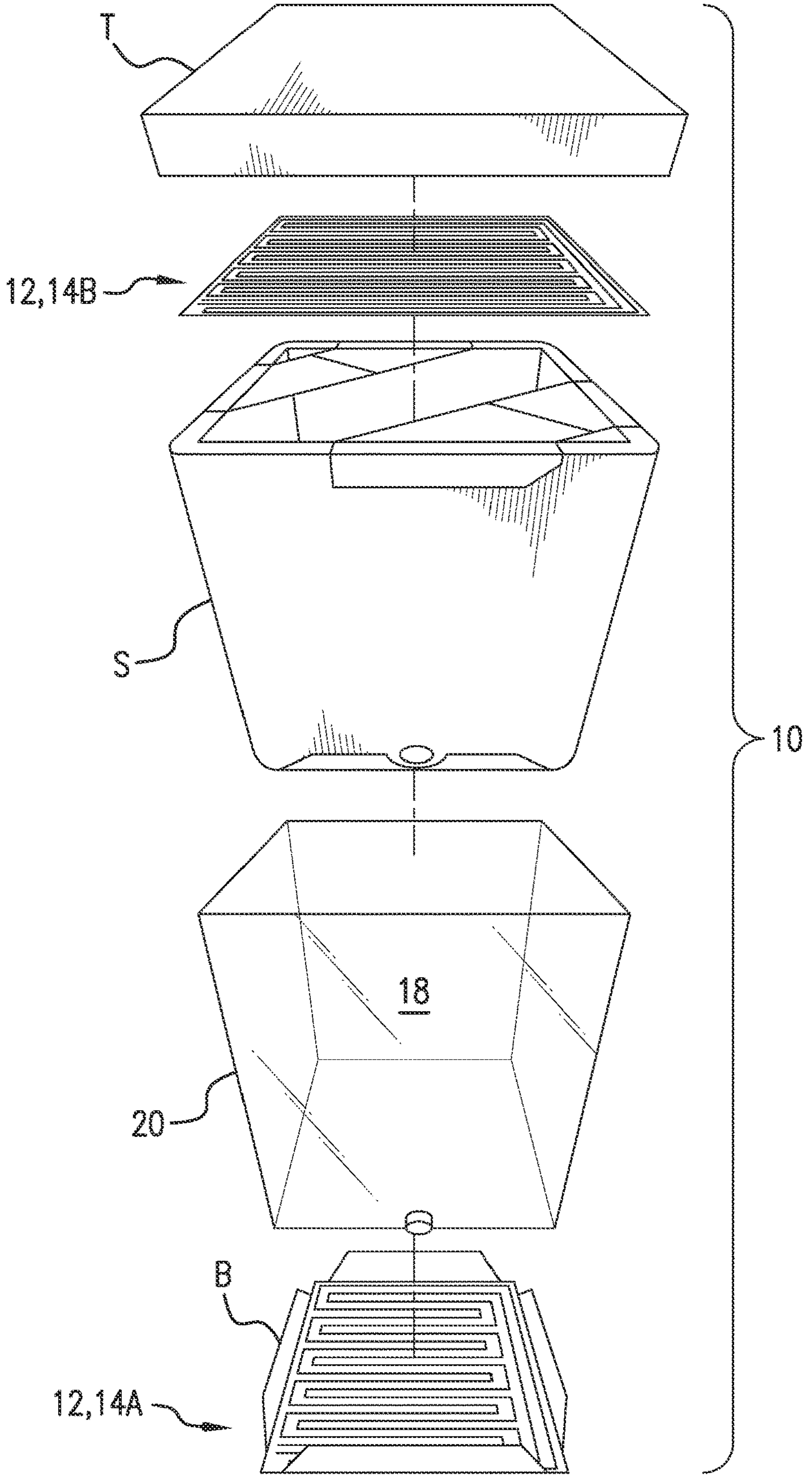
FIG. 1 is an exploded perspective view of an intermediate bulk container with an embodiment of a heating system of the present invention.
Figure 2:
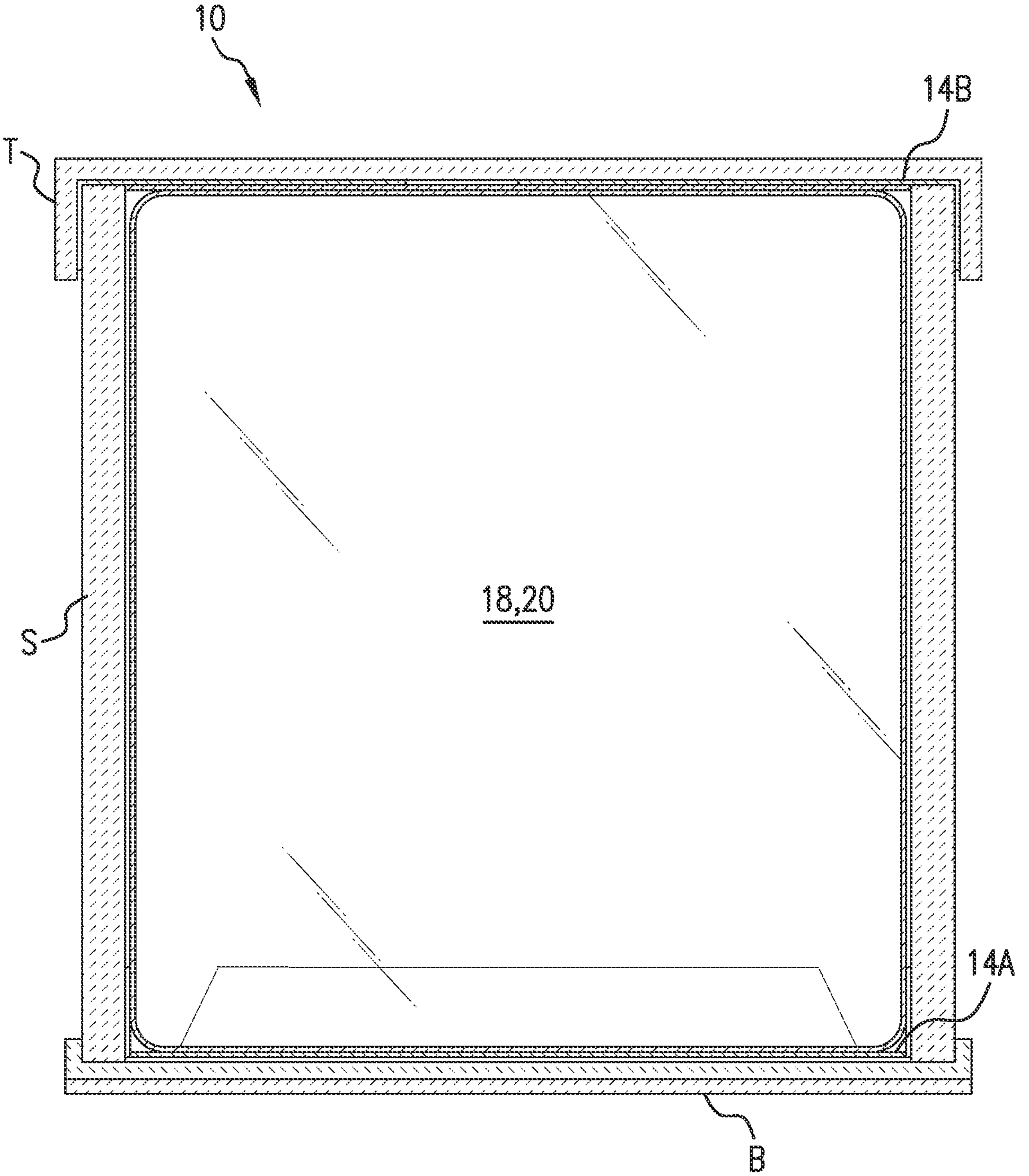
FIG. 2 is a cross-sectional view of the intermediate bulk container of FIG. 1.
Figure 6:
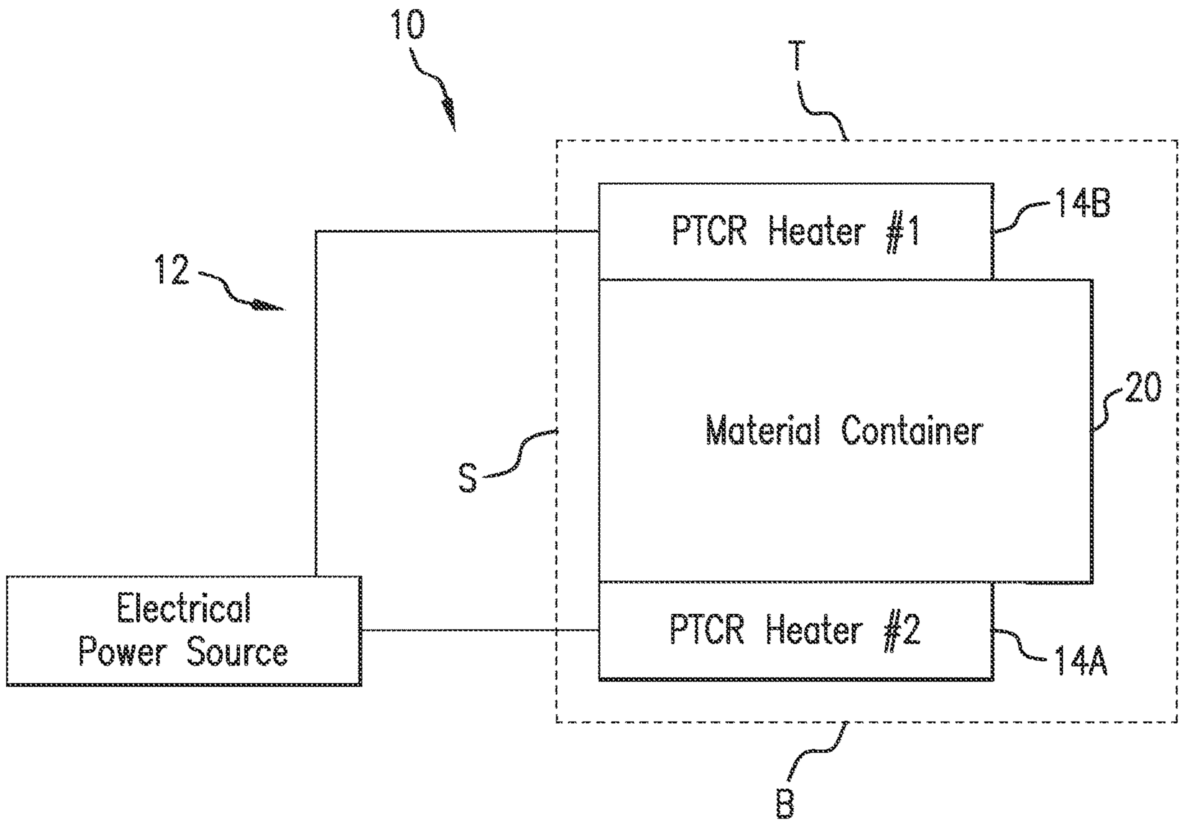
FIG. 6 is a schematic block diagram illustrating components of the heating system of the present invention.

Referring now to the drawings, and more particularly to FIGS. 1 and 2, and with reference to FIG. 6, there is shown, in FIG. 1, an exploded perspective view of elements that form an Intermediate Bulk Containers (IBC) 10 of the present invention. IBC 10 utilizes a heating system 12 that includes at least one resistive heating element 14 (later referred to as heating elements 14A and 14B), which each having at least one positive temperature coefficient resistance (PTCR) portion that significantly increases in electrical resistance as the temperature of a material 18, contained in a material container 20 changes. The temperature of material 18 is typically reflective of the surface temperature of heating elements 14, due to the physical contact therebetween. The magnitude of the PTCR may vary depending on chemistry and/or physical properties of material 18 and the desired temperature that is to be maintained. The "safety" temperature set point at which an order of magnitude of resistance may increase is selected and can vary depending on the particular medium 18 being heated in order to optimize the performance of system 12 and maintain optimal temperatures of material 18 both pre and post phase change of material 18.

IBC 10 may be made of a multiple layer corrugated cardboard and may have at least one layer of insulation to reduce heat transmission therethrough. IBC 10, as illustrated in FIGS. 1 and 2, has a bottom portion B, a top portion T and a sidewall portion S. Material container 20 is positioned on top of a heating element 14A and is shown with a heating element 14B on top of material container 20. The placing of heating elements 14A and 14B help to reduce stratified temperatures in material 18 during shipment or storage during the heating process. It is also contemplated that additional heating elements 14 can be placed along any side of container 20 or even be made a part of container 20.

The present invention, when put into a condition where there is an unevenly distributed load of material 18, and/or variable heat conductivity between heating elements 14 and material 18, automatically sense an unevenly distributed thermal conductivity, which results in an increased temperature (where the conductivity is less), in the localized area, causing the resistance to rise in at least a part of heating element 14 that then serves to reduce and/or essentially shut off power consumption in that zone of a heating element 14. The energy consumption of system 12 is adjusted by way of the PTCR nature of elements 14 due to the temperature of material 18, which results in less energy usage over the warmup period of material 18.

Figure 3:
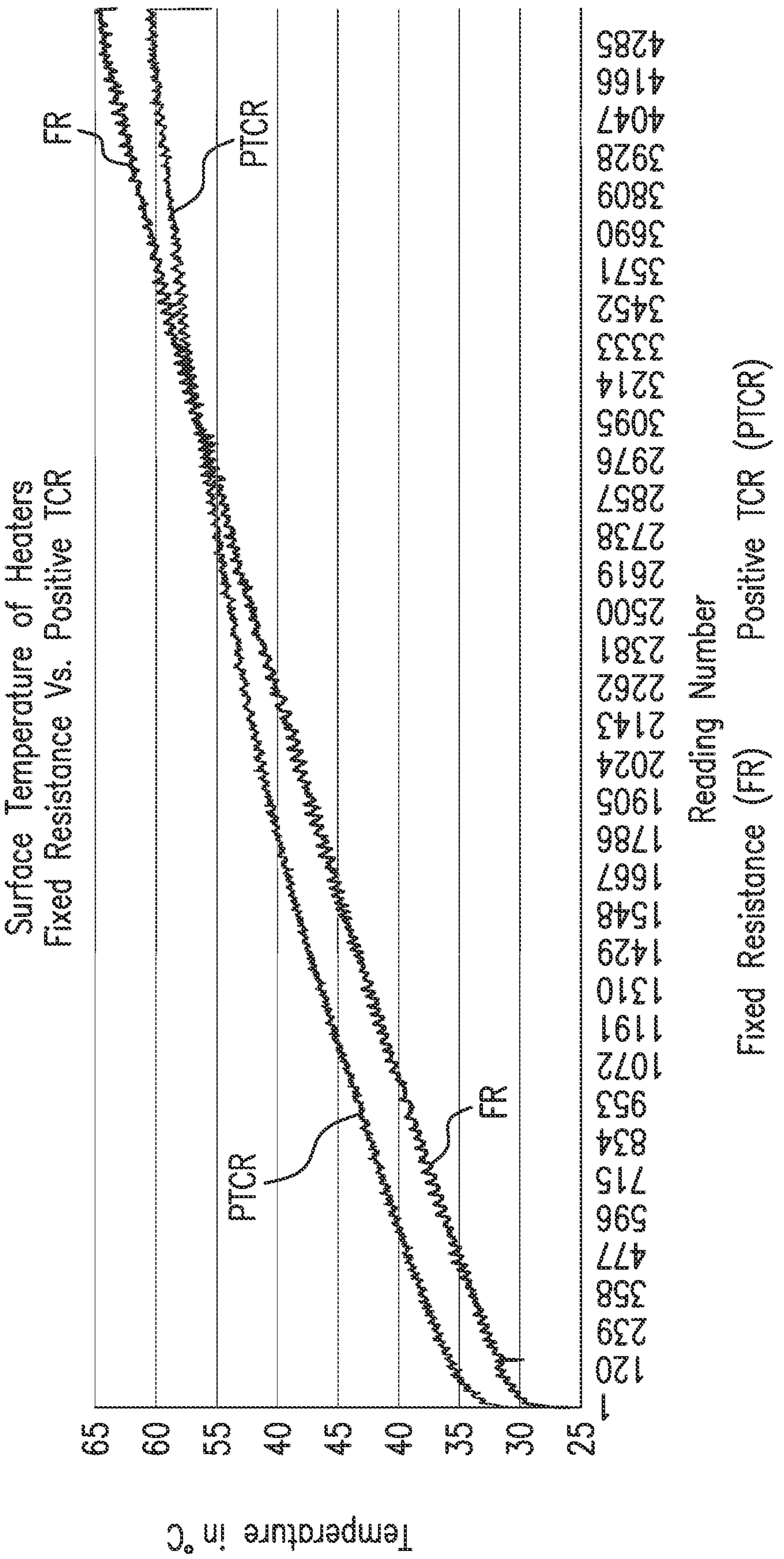
FIG. 3 is a comparison chart illustrating the temperature of the intermediate bulk container of FIGS. 1 and 2 of the heating system of the present invention and that of the prior art.

Now, additionally referring to FIG. 3, there is shown the continual rise in temperature of a fixed resistance heater versus Positive TCR heater elements 14 of the present invention which regulates itself to a specific temperature, for example 60° C. As can be seen, as time progresses, in the form of the reading numbers along the X axis, and as material 18 is warming, a prior art fixed resistance FR continues to increase in temperature until a thermostat turns off the FR power. In the event of an uneven thermal load on the FR heaters, the fixed resistance could potentially move into a thermal runaway operating mode. On the other hand, the Positive TCR heater 14 self-regulate regardless of thermal load/conductivity to material 18.

Figure 4:
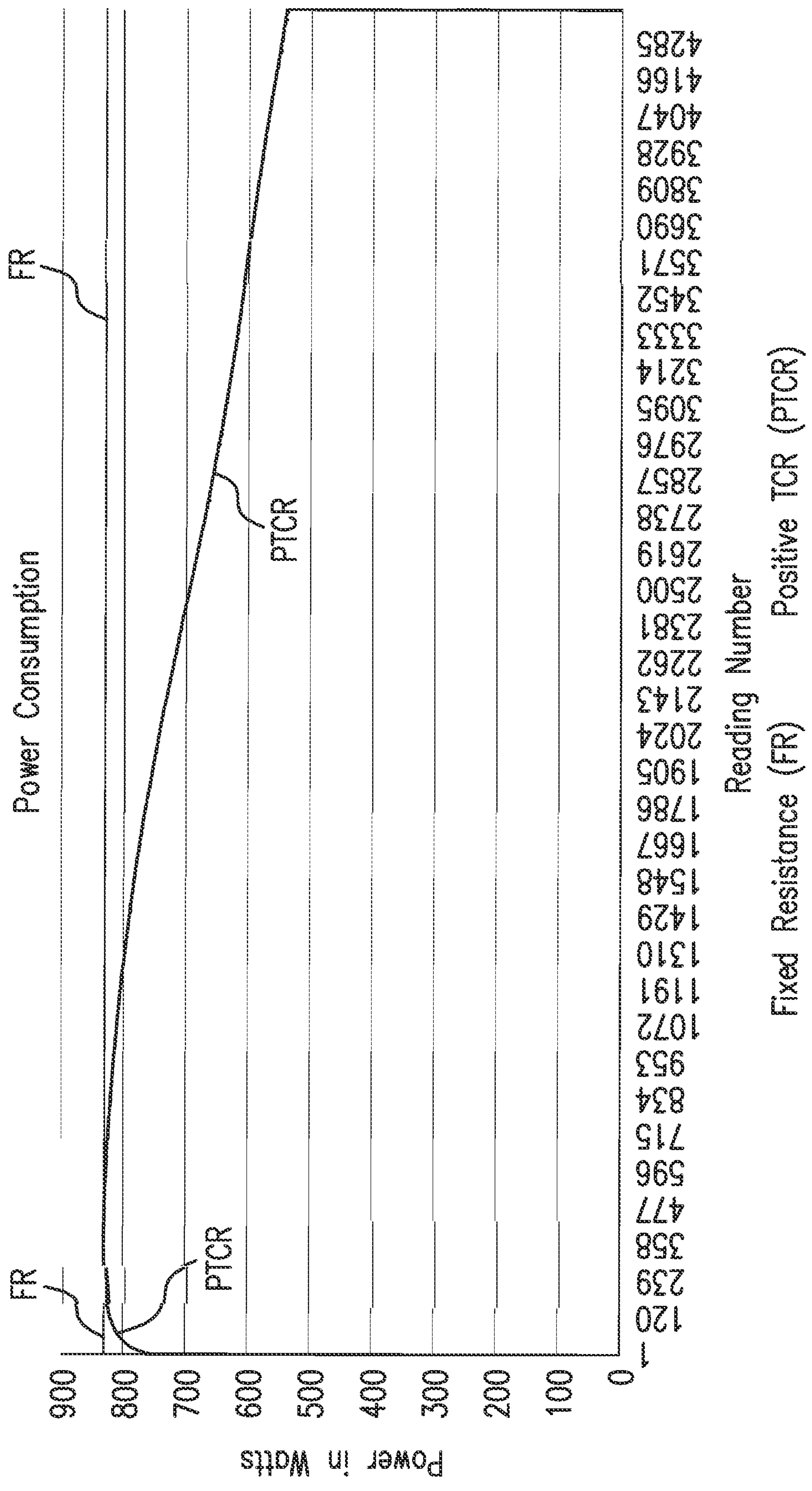
FIG. 4 is another comparison chart illustrating the power consumption of the heating system of the present invention relative to the prior art.

Now, additionally referring to FIG. 4, there is illustrated the electrical power consumption of PTCR heater 14 vs. fixed resistance heater FR. As can be seen, over time (as the reading numbers increase along the X-axis), the power consumption decreases for PTCR heaters 14, while the FR heaters continue until switched off by a controlling thermostat. This present invention leads to less power being consumed overall, since the power consumption is tapered off as heater 14 approaches the preselected temperature based on the PTCR selection. Over the duration of this graph, the unit under test consumed 3.12 MWhr of power using heaters 14. While the power consumption of the fixed resistance FR heater consumed 3.65 MWhr of power, which represents approximately a 15% reduction in energy. It is anticipated that this gap would only grow wider over longer durations of comparison. The comparison presented in FIG. 4 used similar conduction paths for the heater elements for the FR and the PTCR comparison. In the event the heating elements are not properly installed, or have differing thermal conductivities to material 18, the differences will be even more pronounced, due to the distributed temperature control of heating elements 14 of the present invention.

Figure 5:
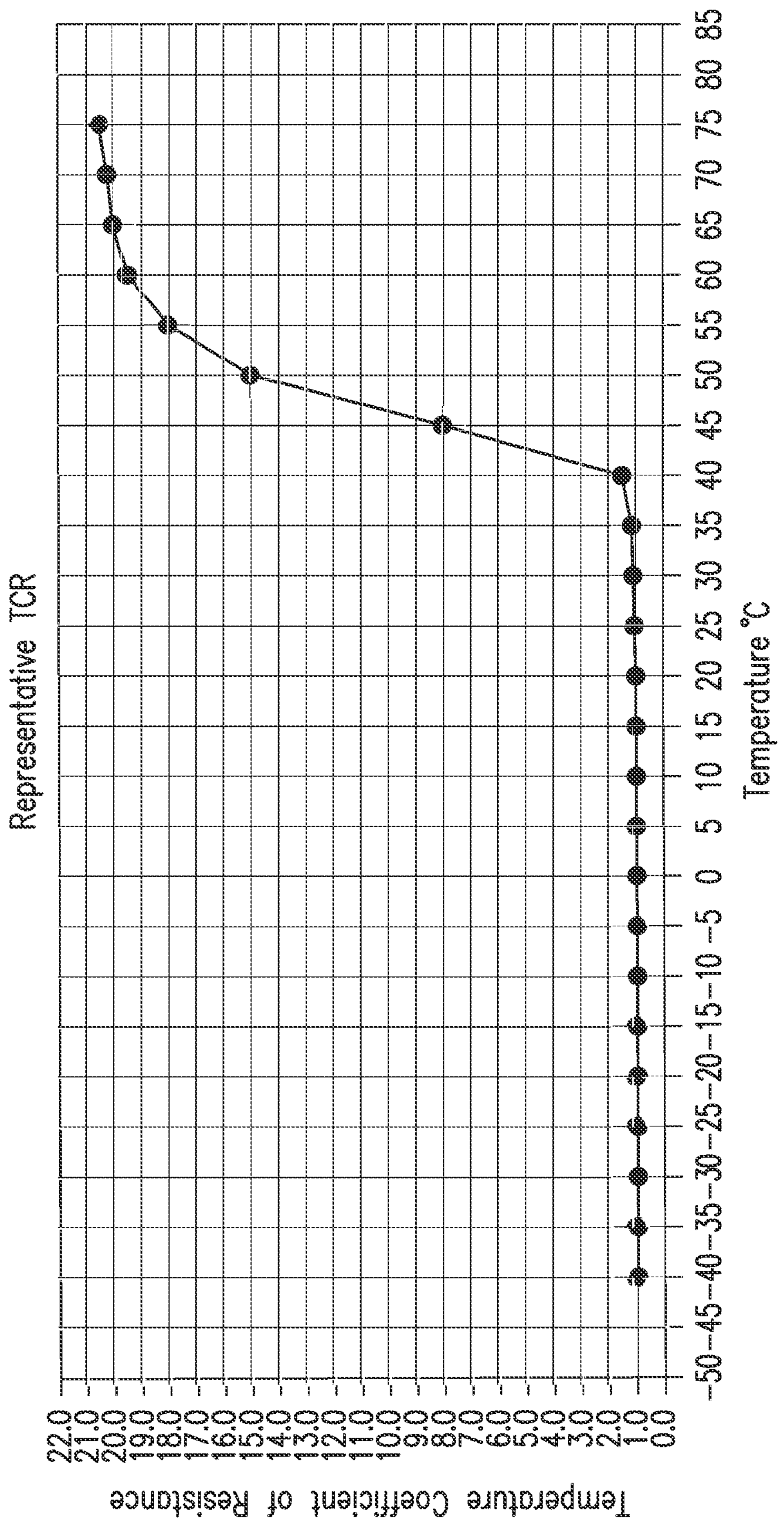
FIG. 5 is a chart illustrating a temperature coefficient of resistance of the present invention relative to the temperature.

Now, additionally referring to FIG. 5 there is illustrated a PTCR heating element 14 with a preselected PTCR value. This is in contrast with a fixed resistance heater FR which would have a flat TCR regardless of temperature. Utilizing a positive TCR heating element 14, the temperature at which the resistance increases dramatically can be varied depending on the chemistry and physical attributes of the heater technology utilized. The temperature coefficient, or slope of the resistance magnification (inclusive of magnitude of change) can vary as well depending on several factors such as chemistry, physical and granular properties of heating element 14.

Now, additionally referring to FIG. 6 there is shown a schematical block diagram of system 12 as it relates to IBC 10. As can be seen heaters 14 are in physical contact with material container 20 to ensure good thermal contact for efficient heat transfer. In the event material container 20 is only partially filled with material 18 the heat transfer from heating element 14B is in a self-regulated way—limited, so heating element 14B would reach the preselected temperature more quickly than heating element 14A thereby causing heating element 14B to more quickly reduce the power consumption of heating element 14B. Heating elements 14 can be a single serial PTCR heating element or a series of parallel PTCR heating elements for more localized control. For example, heating element 14 can have many parallel PTCR circuits to thereby provide heat to material 18. If in the preparation of IBC 10, for example, heating element 14A is partially folded over, instead of causing a hot spot, as the prior art would, the local compensating control of the PTCR heating circuits 14 would compensate and release less heat due to more quickly reaching a localized temperature. As discussed herein, the present invention does not need a thermostatic control for operation and is self-regulating.

The positive temperature coefficient resistant material of heating elements 14 is selected to multiply the resistive value of heating elements 14 as a preselected temperature is achieved. The heat transfer from heating element 14 is primarily to material container 20 and hence to material 18. Intermediate bulk container 10 is made of structural elements that have a lower thermal conductivity than a thermal conductivity of material container 20, to thereby direct the heat from heating elements 14 to material 18.

As noted in FIG. 6, heating elements 14A and 14B can be separately coupled to the electrical power source. With heating elements 14A and 14B being separately electrically self-regulating. Part of the advantages of the present invention are that the positive temperature coefficient resistant material has a selected temperature by which the electrical resistance thereof increases by at least a factor of 10, as part of the self-regulating nature of the PTCR material. As discussed, no thermostat need be connected between the electrical power source and the heating element to gain the advantages of the self-regulation.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of establishing and/or maintaining a desired temperature of a material in an intermediate bulk container, comprising the steps of:

positioning a heating element in at least partial contact with a material container containing the material within the intermediate bulk container, the intermediate bulk container being a multiple layer corrugated cardboard with a layer of insulation, the heating element being next to the material container inside of the intermediate bulk container; and applying an electrical power source to the heating element, wherein the heating element is at least partially made of a positive temperature coefficient resistant material, the heat from the heating element being largely transferred to the material in the material container, the heating element reacting to an unevenly distributed thermal conductivity of the material in a zone by causing an electrical resistance of the heating element to rise in the zone of the heating element thereby reducing electrical power consumption in that zone of the heating element.

2. The method of claim 1 wherein the positive temperature coefficient resistant material is selected to multiply a resistive value as a preselected temperature is achieved.

3. The method of claim 1, wherein heat transfer from the heating element is primarily to the material container, and the intermediate bulk container is made of structural elements that has a lower thermal conductivity than a thermal conductivity of the material container.

4. The method of claim 3, further positioning an other heating element in at least partial contact with the material container.

5. The method of claim 4, wherein the heating element and the other heating element are separately coupled to the electrical power source.

6. The method of claim 4, wherein the heating element and the other heating element are separately electrically self-regulating.

7. The method of claim 1, wherein the positive temperature coefficient resistant material has a selected temperature by which the electrical resistance thereof increases by at least a factor of 10.

8. The method of claim 1, wherein no thermostat is connected between the electrical power source and the heating element.

9. A method of heating a material in an intermediate bulk container, comprising the steps of:

positioning a first heating element beneath a material container containing the material within the intermediate bulk container, the intermediate bulk container being a multiple layer corrugated cardboard with a layer of insulation, the first heating element being next to the material container inside of the intermediate bulk container; and applying an electrical power source to the first heating element, wherein the first heating element is at least partially made of a positive temperature coefficient resistant material, the heat from the first heating element being largely transferred to the material in the material container, the first heating element reacting to an unevenly distributed thermal conductivity of the material in a zone by causing an electrical resistance of the first heating element to rise in the zone of the first heating element thereby reducing electrical power consumption in that zone of the first heating element.

10. The method of claim 9, further comprising a step of positioning a second heating element above the material container.

11. The method of claim 9 wherein the positive temperature coefficient resistant material is selected to multiply a resistive value of the first heating element as a preselected temperature is achieved.

12. The method of claim 9, wherein heat transfer from the first heating element is primarily to the material container, and the intermediate bulk container is made of structural elements that has a lower thermal conductivity than a thermal conductivity of the material container.

13. The method of claim 9, further comprising the step of positioning a second heating element next to a surface of the material container, the first heating element and the second heating element being separately coupled to the electrical power source.

14. The method of claim 13, wherein the first heating element and the second heating element are separately electrically self-regulating.

15. The method of claim 9, wherein the positive temperature coefficient resistant material has a selected temperature by which the electrical resistance thereof increases by at least a factor of 10.

16. The method of claim 9, wherein no thermostat is connected between the electrical power source and the first heating element.

* * * * *